(12) United States Patent
Li et al.

(10) Patent No.: US 10,831,586 B2
(45) Date of Patent: Nov. 10, 2020

(54) METHOD AND ARRANGEMENT FOR DETERMINING AN ABNORMAL STATE OF A SYSTEM

(71) Applicants: Rui Li, Shandong (CN); Henning Ochsenfeld, Oldenburg (DE)

(72) Inventors: Rui Li, Shandong (CN); Henning Ochsenfeld, Oldenburg (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 220 days.

(21) Appl. No.: 15/985,600

(22) Filed: May 21, 2018

(65) Prior Publication Data
US 2018/0336082 A1    Nov. 22, 2018

(30) Foreign Application Priority Data

May 22, 2017   (EP) .................................... 17172168

(51) Int. Cl.
| G06F 11/00 | (2006.01) |
| G06F 11/07 | (2006.01) |
| G06Q 10/06 | (2012.01) |
| G05B 23/02 | (2006.01) |

(52) U.S. Cl.
CPC ........ G06F 11/079 (2013.01); G05B 23/0227 (2013.01); G06F 11/006 (2013.01); G06F 11/0736 (2013.01); G06Q 10/0639 (2013.01); G06F 2201/86 (2013.01)

(58) Field of Classification Search
CPC ... G06F 11/006; G06F 11/0736; G06F 11/079
See application file for complete search history.

(56) References Cited

U.S. PATENT DOCUMENTS

| 7,480,640 | B1 | 1/2009 | Elad et al. | |
| 2005/0154562 | A1* | 7/2005 | Matsuura | G06F 11/008 |
| | | | | 702/185 |
| 2005/0157327 | A1* | 7/2005 | Shoji | G06K 15/408 |
| | | | | 358/1.14 |
| 2008/0285861 | A1* | 11/2008 | Mitarai | G06K 9/6234 |
| | | | | 382/224 |
| 2011/0161743 | A1* | 6/2011 | Kato | G06F 11/0709 |
| | | | | 714/47.2 |

(Continued)

OTHER PUBLICATIONS

European Search Report for European Patent Application No. 17172168.1-1958, dated Sep. 22, 2017.

(Continued)

*Primary Examiner* — Joshua P Lottich
(74) *Attorney, Agent, or Firm* — Lempia Summerfield Katz LLC (57) ABSTRACT

A similarity between a pattern distribution of selected state patterns of system state descriptions in a first set of system state descriptions and an average pattern distribution of the selected state patterns of the system state descriptions in a second set of system state description is determined. The similarity is compared with a plurality of such similarities between the pattern distributions within the second set of system state descriptions and the average pattern distribution in the second set of system state descriptions. An abnormal state of the system is determined using this comparison.

19 Claims, 3 Drawing Sheets

(56) References Cited

U.S. PATENT DOCUMENTS

| | | | |
|---|---|---|---|
| 2014/0115002 A1 | 4/2014 | Kocher et al. | |
| 2014/0149806 A1* | 5/2014 | Khalastchi | G06K 9/00496 714/49 |
| 2014/0330519 A1* | 11/2014 | Mueller | G01V 99/00 702/2 |
| 2015/0269050 A1* | 9/2015 | Filimonov | G06N 7/005 702/183 |
| 2016/0124792 A1* | 5/2016 | Togawa | G06F 11/079 714/37 |
| 2018/0046529 A1* | 2/2018 | Togawa | G06F 11/079 |
| 2018/0075235 A1* | 3/2018 | Tajima | G06F 21/554 |
| 2018/0309770 A1* | 10/2018 | Han | G06F 9/455 |
| 2019/0377027 A1* | 12/2019 | Rivoir | G01R 31/2846 |

OTHER PUBLICATIONS

Han, Jiawei, et al. "Prefixspan: Mining sequential patterns efficiently by prefix-projected pattern growth." proceedings of the 17th international conference on data engineering. 2001.

European Office Action for European Application No. 17 172 168.1-1222 dated May 19, 2020.

Wikipedia "Log File" XP055676546. https://en.wikipedia.org/wiki/Log_file pp. 1-4.

Wikipedia "Mahalanobis Distance" XP055676538. https://en.wikipedia.org/wiki/Mahalanobis_distance pp. 1-5.

* cited by examiner

FIG 3

| Sequence pattern | Frequency |
|---|---|
| #101#104#103 | 67 |
| #104#102 | 61 |
| #104#101 | 43 |
| ... | |
| #103#101 | 12 |

FIG 4 n = 1

| Sequence pattern | Frequency |
|---|---|
| #101#104#103 | 67 |
| #104#102 | 61 |
| #104#101 | 43 |
| ... | |
| #103#101 | 12 | n = 2

| Sequence pattern | Frequency |
|---|---|
| #101#104#103 | 68 |
| #104#102 | 59 |
| #104#101 | 41 |
| ... | |
| #103#101 | 10 | n = N

| Sequence pattern | Frequency |
|---|---|
| #101#104#103 | 65 |
| #104#102 | 64 |
| #104#101 | 45 |
| ... | |
| #103#101 | 13 |

$$X = \begin{vmatrix} 67 & 68 & ... & 65 \\ 61 & 59 & ... & 64 \\ 43 & 41 & ... & 45 \\ ... & ... & ... & ... \\ 12 & 10 & ... & 13 \end{vmatrix}$$

→ Time

→ Number of patterns

METHOD AND ARRANGEMENT FOR DETERMINING AN ABNORMAL STATE OF A SYSTEM

This application claims the benefit of EP 17172168.1, filed on May 22, 2017, which is hereby incorporated by reference in its entirety.

BACKGROUND

The present embodiments relate to determining an abnormal state of a system.

Devices, machines, or plants (e.g., "systems"), as well as processes running in such devices, machines, or plants, may fail or stop due to particular errors occurring there (e.g., without a corresponding error message or prior warning for such errors), with sufficiently long lead time/warning time (e.g., to be able to react appropriately to such errors) being received by operators of these devices, machines, plants, or processes.

In some circumstances, this may result in unscheduled stoppages and production downtimes for these devices, machines, plants, or processes, and therefore, in undesirable costs such as downtime costs, repair cost, and the like.

SUMMARY AND DESCRIPTION

Particularly for central and/or cost-intensive devices, machines, or plants, as well as processes running in such devices, machines, or plants, methods that make the operators aware of any malfunctions and errors occurring in good time, or even at all, are to be provided.

Such early error detection methods for devices, machines, plants, and processes are often known as anomaly detection methods (e.g., methods for detecting an abnormal state of a system) and are generally based on analysis of system states.

Because of the large number of system parameters that feed into the system states to be analyzed, anomaly detection of this kind is an extremely complex task. If anomaly detection is performed "manually" (if possible at all) by an observer monitoring the system, the states or, more specifically, the system parameters, this may require an observer having specific experience and/or specific knowledge (e.g., concerning the device, machine, plant, or process) or may also reach the observer's physical and mental limits. If the anomaly detection is performed automatically (again if possible at all) by a monitoring system (e.g., using a computer), relevant resource limits of such monitoring systems may be reached.

The scope of the present invention is defined solely by the appended claims and is not affected to any degree by the statements within this summary.

The present embodiments may obviate one or more of the drawbacks or limitations in the related art. For example, disadvantages associated with prior art system state monitoring are eliminated, and automated, state-based monitoring with the possibility of anomaly detection is provided.

A method and an arrangement for determining an abnormal state of a system are provided. The system states of the system are described using system state descriptions.

Advantageous embodiments and advantages relate to the method and the arrangement.

The method and the arrangement for determining an abnormal state of a system provide that the system states are described using system state descriptions.

Such a system state description may be an event log data item, for example. Such a system state description or event log data item may have a date and/or time indication that may specify when the system state description or event log data item has been generated (e.g., by the system) or at what point in time the system state description or event log data item describes the system.

Such a system state description or event log data item has a, for example, semantic indication describing and/or representing and/or characterizing a state of the system.

In addition, it may also be advantageous for such a system state description or event log data item to be assigned an alphanumeric value (e.g., using a "dictionary" that contains an assignment to a corresponding alphanumeric value for a plurality of possible system state descriptions, or such event log data items).

The system may generate a plurality or multiplicity of such system state descriptions or event log data items (e.g., for a plurality or multiplicity of points in time that may then be structured ("structuring") in a time series (e.g., sequence).

If the system state descriptions or event log data items are assigned the corresponding alphanumeric value (e.g., transformation), this structured time series (e.g., sequence) of system state descriptions or event log data items may then be transformed into a structured time series (e.g., sequence) of the alphanumeric values.

For the method and the arrangement, it is then additionally provided that a similarity between a pattern distribution of selected state patterns of the system state descriptions in a first set of system state descriptions and an average pattern distribution of the selected state patterns of the system state descriptions in a second set of system state descriptions is determined.

"Pattern" may generally denote a static structure that has been detected due to an identical recurrence (e.g., in a structured entire space). In other words, "pattern" is a way of thinking, organizing, and behaving or a corresponding course of action intended for uniform repetition (e.g., reproduction).

A "pattern" may also be a feature or a plurality of interrelated features (e.g., interrelated features) that are maintained/reproduced within repetitions of a larger interrelation. The repetitions may be of a spatial and/or temporal kind or even of a reproductive kind.

In one embodiment, the first set of system state descriptions (e.g., also expressed by the event log data or transformed into the alphanumeric values) contains system state descriptions to be examined (for an anomaly) and/or a time series of system state descriptions ("sequence" (or even "sub-sequence")) of a first time period (e.g., of a day ("day sequence")).

In one embodiment, the second set of system state descriptions (e.g., also expressed by the event log data or transformed into the alphanumeric values) contains reference system state descriptions or system state descriptions (e.g., predefinable) describing a normal scenario and/or a time series of system state descriptions of a second time period (e.g., of a plurality of days, of one or more weeks, and/or of one or more months ("week/month sequence" or "entire sequence")).

In one embodiment, the second time period is a multiple of the first time period. For example, the first time period is a day, and the second time period is a plurality of weeks or months.

An entire sequence (e.g., of system state descriptions or event log data or alphanumeric values) may then be subdivided or "sliced" into N (N=number) sub-sequences (e.g., of system state descriptions or event log data items or alphanumeric values).

In addition, the similarity is a statistical distance (e.g., a Mahalanobis distance MD).

The Mahalanobis distance MD is a distance (e.g., a statistical distance) or a measure of a statistical distance between a data point and a centroid of a multivariate space (e.g., general mean) and is mainly used to identify "outliers" (e.g., in principal component analysis). It is a more selective multivariate method for identifying "outliers" than considering one variable at a time, as the different scales of the variables and the correlations between the variables are taken into account.

In one embodiment, a selected state pattern is determined or selected using a method of "sequential pattern mining" (e.g., a "PrefixSpan" algorithm; from the system state descriptions (also expressed by the event log data or transformed into the alphanumeric values) of the second set of system state descriptions (also expressed by the event log data or transformed into the alphanumeric values), in particular, from/in the "entire sequence").

As an illustrative example, a selected state pattern may be determined by applying the "PrefixSpan" algorithm to the entire sequence describing the normal scenario of the system.

For this purpose, the second set of the system state descriptions (e.g., also expressed by the event log data or transformed into the alphanumeric values) is sub-divided/split or "sliced" into N (N=number) of the first sets of the system state descriptions (e.g., also expressed by the event log data or transformed into the alphanumeric values; the "entire sequence" is "split" into N "sub-sequences"), and a "sequential pattern mining" method (e.g., the "PrefixSpan" algorithm) is applied to these N first sets of the system state descriptions (e.g., also expressed by the event log data or transformed into the alphanumeric values) or to the N "sub-sequences".

Such a "PrefixSpan" algorithm (cf., "PrefixSpan: Mining Sequential Patterns Efficiently by Prefix-Projected Pattern Growth", Jian Pei, Jiawei Han, Behzad Mortazavi-Asl, Helen Pinto, Intelligent Database Systems Research Lab. School of Computing Science, Simon Fraser University, Burnaby, B.C., Canada V5A 1S6, Qiming Chen, Umeshwar Dayal, Mei-Chun Hsu, Hewlett-Packard Labs. Palo Alto, Calif. 94303-0969 U.S.A.) is a "sequential pattern mining" method configured to discover patterns that are "hidden" (e.g., in chronological successions of alphanumeric values (cf., (time) sequence, entire sequence, then "sequential pattern")).

Such a "PrefixSpan" algorithm may also have different parameterizing possibilities for influencing the number and significance of found (e.g., repeating and thus discoverable) structures of system state descriptions, event log data items, alphanumeric values, or "sequential patterns" (e.g., patterns in a sequence ("sequential patterns")).

Such parameterizing possibilities may be: a "percentage coverage" (e.g., percentage of the total observations (time series) in which the found pattern is to be represented in order to be deemed significantly present; a "maximum number" of sequence items (e.g., system state descriptions or event log data items or alphanumeric values); resulting sequential patterns will not therefore exceed the maximum predefinable number of items; and a "maximum number" of gap items (e.g., how many irrelevant items (system state descriptions or event log data items or alphanumeric values) may exist between two items of a found sequential pattern).

In addition, a "ranking" of the selected state patterns found, for example, using the "PrefixSpan" algorithm is produced (e.g., having a frequency as the ranking criterion ("sorting")).

With such a ranking of the state patterns, a frequency distribution for these selected state patterns (e.g., the pattern distribution) may then be created for the system state descriptions of the first set of system state descriptions (e.g., of a sub-sequence to be examined) and/or of the second set of system state descriptions (e.g., of an entire sequence describing a normal scenario of the system).

It is determined how often a particular state pattern, a found sequential pattern of the selected state patterns, or found sequential patterns are present in the first set of system state descriptions, or sub-sequence, and/or in the second set of system state descriptions, or entire sequence.

For example, a frequency distribution (e.g., of the selected state patterns or found sequential patterns) may be determined/created for the N (N=number) first sets of system state descriptions contained in the second set of system state descriptions.

In other words, the frequency distribution (e.g., of the selected state patterns or found sequential patterns) may be established (e.g., "sequential pattern frequencies") for each (e.g., n=1 to N) sub-sequence contained in the entire sequence.

Expressed mathematically, this provides that N vectors of sequential pattern frequencies (e.g., the frequency distributions of the selected state patterns or found sequential patterns in the N sub-sequences or N first sets of system state descriptions of the entire sequence) are extracted and calculated, and arranged as a matrix.

In addition, using at least one plurality of pattern distributions of the selected state patterns of the system state descriptions in the first set of the system state descriptions, the average pattern distribution (e.g., of the selected state patterns of the system state descriptions in the second set of system state descriptions, or entire sequence) is determined (e.g., using an estimate (training of multivariant frequency patterns for a system scenario; a system normal scenario)).

This provides that, using the N frequency distributions of the N sub-sequences or rather of such a matrix (e.g., of the N sequential pattern frequency vectors), the average pattern distribution of the selected state patterns of the system state descriptions in the second set of system state descriptions (e.g., entire sequence) may then be expediently determined (e.g., "training of the multivariant frequency pattern").

For this purpose (e.g., to determine the average pattern distribution and as a (mathematical) description of the average pattern distribution), a covariance matrix S (e.g., of the N sequential pattern frequency vectors arranged to form a matrix) and an arithmetic mean $\mu$, (e.g., a component-wise arithmetic mean $\mu$) may be determined.

As the average pattern distribution or the covariance matrix S (e.g., of the N sequential pattern frequency vectors arranged in a matrix) and the arithmetic mean $\mu$ may be strongly influenced by "outliers", a robust estimate of the location of the arithmetic mean $\mu$ and of the scatter of the covariance matrix S, for example, may be used.

The covariance matrix S and the arithmetic mean $\mu$ may then be used to determine the similarity between a pattern distribution of selected state patterns of the system state descriptions in a first set of system state descriptions (e.g., a sub-sequence n (expressed by a vector $x_n$ (sequential pattern frequency vectors))), and the average pattern distribution (e.g., expressed by the covariance matrix S and the arithmetic mean $\mu$) of the selected state patterns of the system state descriptions in the second set of system state descriptions (e.g., expressed by the matrix X of the sequential pattern frequency vectors $x_n$; the entire sequence) based on the Mahalanobis distance MD. For example, by $$MD_n = \sqrt{(x_n-\mu)^T S^{-1} (x_n-\mu)}.$$

The matrix X (e.g., of an entire sequence) of the sequential pattern frequency vectors $x_n$ (e.g., of the N sub-sequences of the entire sequence) may thus also be translated into a one-dimensional series (e.g., time series) of the distance values $MD_n$ (e.g., for each of the sequential pattern frequency vectors $x_n$).

A distribution statistic may then be applied to such a series (e.g., time series). Thus, for example, a mean value $\mu$ and/or a variance $\sigma$ may be determined for such a series (e.g., time serier). For example, the series (e.g., time series) may be assumed to have a Gaussian distribution.

In order, for example, to be able to differentiate an abnormal system state or system scenario from a normal system state or system scenario, the system state descriptions of the second set of the system state descriptions may be at least as far as possible normal system states, and thus, the average pattern distribution for a system normal scenario is determined. In addition, the system state descriptions of the first set of the system state descriptions may then advantageously be system states to be examined (e.g., for an anomaly).

In addition, for the method and the arrangement, this similarity is compared with a plurality of similarities between pattern distributions within the second set of system state descriptions and the average pattern distribution in the second set of system state descriptions.

An abnormal state of the system is then determined using this comparison.

The similarity of the sub-sequence (e.g., to-be-examined) or, more specifically, the pattern distribution of the sub-sequence (e.g., to-be-examined) to the entire sequence (e.g., system normal) or, more specifically, the average pattern distribution of the entire sequence (e.g., system normal) is compared with the similarities exhibited by the sub-sequences contained in the entire sequence or, more specifically, the pattern distributions thereof (e.g., system normal) to the entire sequence or, more specifically, the average pattern distribution (e.g., system normal) of the entire sequence (e.g., system normal).

In other words and by way of example, the Mahalanobis distance MD of a sub-sequence to be examined, or, more specifically, the sequential pattern frequencies thereof, with respect to the entire sequence matrix of the sub-sequences (e.g., vectorially arranged), or, more specifically, the sequential pattern frequencies thereof, is compared with the entire sequence matrix translated into the one-dimensional (time) series of Mahalanobis distances MD.

In one embodiment, the similarity comparison is performed using statistical distribution parameters (e.g., a mean value $\mu$ and/or a variance $\sigma$) that are determined for the plurality of the similarities (e.g., for the Mahalanobis distances MD of the series (time series)).

In one embodiment, a predefinable sensitivity parameter $\alpha$ is used for the similarity comparison.

In addition, for the similarity comparison, a comparison value $\delta$ may be used for a plurality of the similarities (e.g., using the mean value $\mu$ and/or the variance $\sigma$ and/or the sensitivity parameter).

If the similarities are the Mahalanobis distances MD (e.g., of the series (time series); having the distribution parameters mean value $\mu_{MD}$ and variance $\sigma_{MD}$), this comparison value $\delta$ may thus be determined such that $$\delta = \mu_{MD} + \alpha \sigma_{MD}.$$

In one embodiment, the system is a device (e.g., a medium-voltage converter), a machine, a plant, or a process running in a device, plant, or machine.

The method and arrangement thus provide automated anomaly detection based on hitherto not humanly analyzable system state descriptions (e.g., event log data streams), or generically on any kind of alphanumeric data streams. This provides that patterns may be detected therein and generally utilized.

One or more of the present embodiments and the developments described may be realized both in software and in hardware (e.g., using a specific electrical circuit).

In addition, the realization of one or more of the present embodiments or of a described development may be provided by a computer-readable storage medium (e.g., non-transitory) on which a computer program that executes one or more of the present embodiments or developments is stored.

One or more of the present embodiments and/or each development described may also be realized by a computer program product having a storage medium on which a computer program that executes one or more of the present embodiments and/or developments is stored.

The hitherto provided description of advantageous embodiments contains numerous features, at least some of which are combinable. However, these features may also be considered individually and combined to form other meaningful combinations. For example, these features may be combined individually and in any suitable combination with the method of one or more of the present embodiments and the arrangement of one or more of the present embodiments. Thus, method features, concretely formulated, may also be seen as a property of the corresponding arrangement, and vice versa.

Even if some terms are used in the singular or in conjunction with a numeral in the description or in the claims, the scope of the invention shall not be limited to the singular or the respective numeral for these terms. Moreover, the words "a" or "an" are not to be understood as numerals but as indefinite articles.

The above described characteristics, features, and advantages of the invention and the way in which the characteristics, the features, and the advantages are achieved will become clearer and more readily comprehensible in conjunction with the following description of the exemplary embodiments that will be explained in greater detail with reference to the accompanying drawings. The exemplary embodiments serve to explain the invention and do not limit the invention to the combinations of features specified therein, nor in relation to the functional features. In addition, suitable features of each exemplary embodiment may also be explicitly considered in isolation, removed from the exemplary embodiment, incorporated in another exemplary embodiment for the supplementation thereof, and combined with any of the claims.

DETAILED DESCRIPTION

Figure 6:
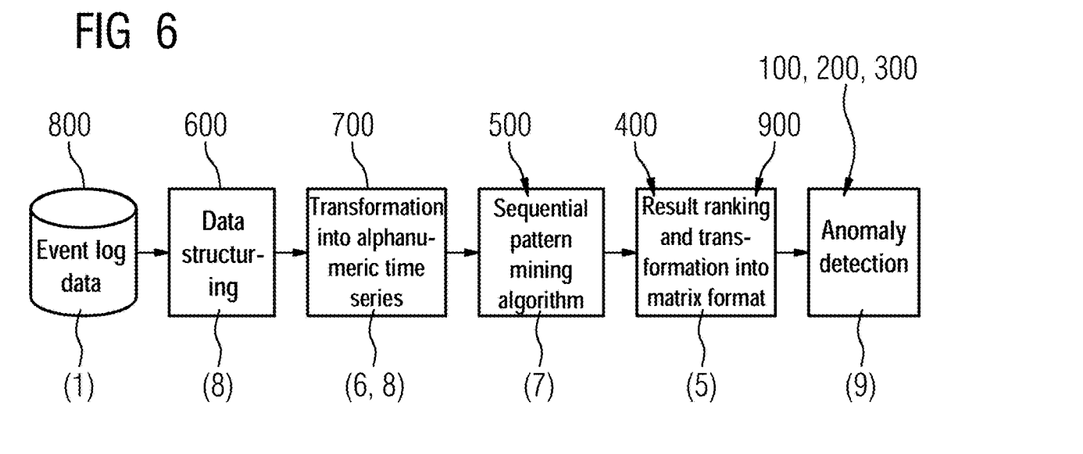
FIG. 6 shows a schematic representation of an exemplary procedure for determining an abnormal state of a system

FIG. 6 shows, in an overview, a schematic representation of a procedure for determining an abnormal state of a system 300 (e.g., anomaly detection 300) such as, for example, a technical device such as a medium-voltage converter.

FIGS. 1 to 5 show or make clear relevant parts of the procedure or of anomaly detection 300 in a schematically simplified representation.

The technical device (e.g., the medium-voltage converter; "device" for short) generates, as illustrated in FIG. 6, event log data 1 (cf., FIG. 6, "Event log data" 800) that describes system states of the device. This event log data 1 accumulates for extraction at an interface of the device.

Figure 1:
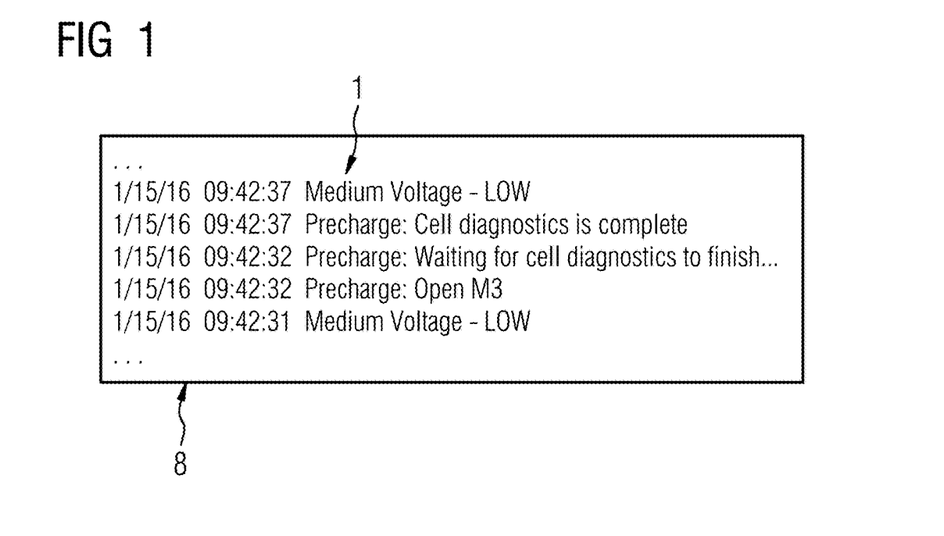
FIG. 1 shows a schematic representation of exemplary event log data of a technical device.

FIG. 1 shows an exemplary extract of such event log data 1.

A particular item of the event log data 1 includes, as shown in FIG. 1, a date indication (cf., FIG. 1, "1/15/16"), a time indication (cf., FIG. 1, "09:42:37") and a semantic description of a device state, an "event message" (also system information) (cf., FIG. 1, "Medium Voltage—LOW").

As FIG. 1 likewise shows and is illustrated in FIG. 6 (cf., FIG. 6, "Data structuring" 600), the event log data 1 is time-structured 600 and forms, in successive lines (cf., FIG. 1), a times series 8.

As FIG. 6 also illustrates (cf., FIG. 6, "Transformation into alphanumeric time series" 700), this structured event log data 1 is now transformed 700 in a first step into a symbolic time series notation based on a kind of dictionary.

Figure 2:
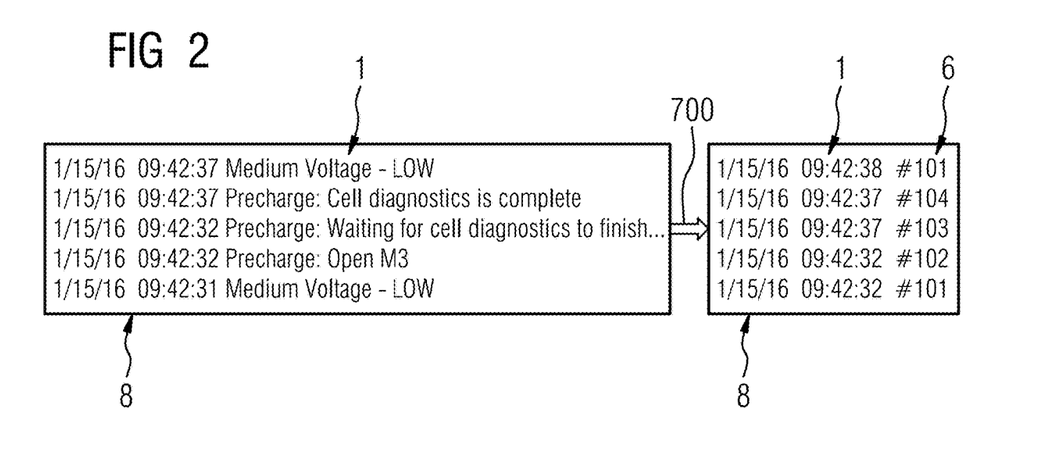
FIG. 2 shows a schematic representation of an exemplary transformation of event log data of a technical device into a time series of alphanumeric values.

This provides that each event message of a particular type is assigned a symbol 6 (e.g., of an alphanumeric kind; an alphanumeric value 6) (cf., FIG. 2, "#101" (Medium Voltage—LOW), "#102" (Precharge: Open M3), "#103" (Precharge: Waiting for cell diagnostics to finish . . . ) or "#104" (Precharge: Cell diagnostics is complete), etc., so that the time-structured event log data from FIG. 1 may be expressed/transformed (700) according to the notation in FIG. 2 (cf., FIG. 6, "Transformation into alphanumeric time series" 700).

For example, as FIG. 2 illustrates, the event log data item "1/15/16 09:42:37 Medium Voltage LOW" is thus transformed 700 to "1/15/16 09:42:37 #101."

This produces, as FIG. 2 shows, a time series 8 (e.g., sequence) including alphanumeric symbols 6 or values 6 that, as FIG. 6 illustrates, is now submitted 500 to a "Sequential Pattern Mining Algorithm," the "PrefixSpan" algorithm (cf., FIG. 6, "Sequential Pattern Mining Algorithm" 500).

The "PrefixSpan" algorithm is a sequential pattern mining method configured to detect hidden patterns in chronological sequences of alphanumeric values.

Thus, for example, a notation of a sequence of the form (A B C) provides that first an item A occurs, followed by an item B, and then an item C at the end (e.g., a notation of a sequence of the form (#101#104#103) provides that first an item #101 (Medium Voltage—LOW) occurs, followed by an item #104 (Precharge: Cell diagnostics is complete), and then an item #103 (Precharge: Waiting for cell diagnostics to finish . . . ) at the end (cf. FIG. 3)).

The PrefixSpan algorithm also has parameterizing options for influencing the number and significance of found sequential patterns.

The parameterizing options include: a) Percentage coverage (e.g., the percentage of the total observations (time series) in which the found pattern is to be represented in order to be deemed significantly present); b) maximum number of sequence items; for example, the sequence (A B C) is a 3-item set, and resulting sequential patterns will not therefore exceed the maximum predefined number of items; and c) maximum number of gap items (e.g., how many irrelevant alphanumeric values may exist between two items of a found sequential pattern; in the sequence (A F X B C), the values F and X are gap items between the items A and B actually "of interest").

Based on the event log data 1 transformed into the time series 8 or sequence 8 (e.g., in the form of the alphanumeric symbols/values 6), the "PrefixSpan" algorithm, as FIG. 6 illustrates (cf., FIG. 6, "Sequential Pattern Mining Algorithm" 500), is now applied using particular parametrizations.

The entire sequence (e.g., a plurality of weeks/months) is split up into N sequences of the length of a day. In these day sequences, the "PrefixSpan" algorithm looks for significantly frequently occurring sequences and outputs the sequences as a result or, more precisely, as resulting found sequential patterns 2, including the sequence frequency 10 occurring.

Figure 3:
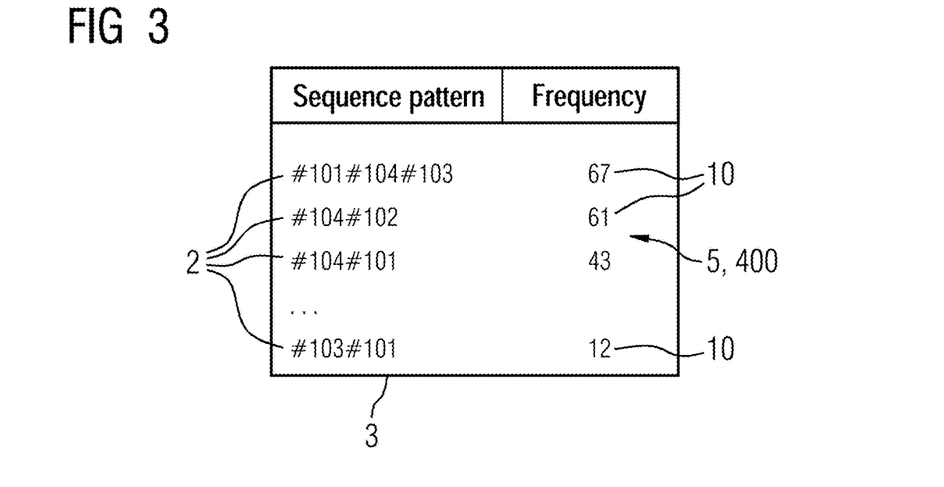
FIG. 3 shows a schematic representation of a list of an exemplary sequential pattern found in a sub-sequence and sorted according to pattern frequencies.

As shown in FIG. 3, the resulting list of sequential patterns 2 found in the n-th daily time series is sorted 400 by pattern frequency 10 ("Ranking", cf., FIG. 6, 400).

Thus, as FIG. 3 illustrates, for an n-th daily time series (3), the sequential pattern 2 #101#104#103 occurs with a highest frequency 10 of 67 (e.g., at times, in the n-th daily time series (3)), and the sequential pattern 2 #104#102 occurs with a second highest frequency 10 of 61 (e.g., at times, in the n-th daily time series (3)), etc., and the sequential pattern 2 #103#101 occurs with the lowest frequency 10 of 12 (e.g., at times, in the n-th daily time series (3)) (cf., FIG. 3).

Figure 4:
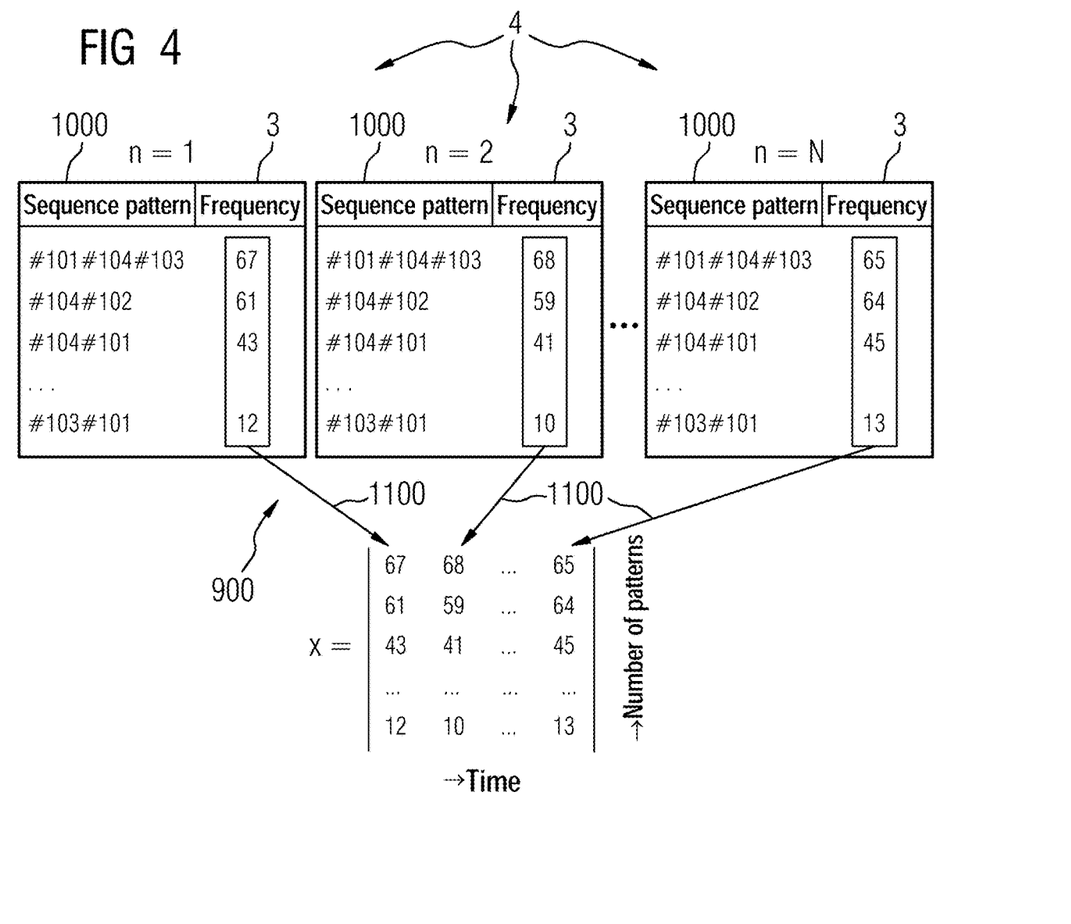
FIG. 4 shows a schematic representation of a matrix of an exemplary multivariant frequency distribution of an entire sequence.

As FIG. 4 shows and FIG. 6 illustrates (cf., FIG. 6, "Transformation into matrix format" 900), if N days of data, in which the device was demonstrably in "normal mode", is available, for each of these days n=1, . . . , N, the vectors $x_n$ of the sequential pattern frequencies may be extracted 1000 and arranged as a matrix X 1100 (900).

This matrix format (of the matrix X) now allows training of the multivariate frequency patterns for "normal operating scenarios" of the device.

The covariance matrix S of the matrix X and the Mahalanobis distance $MD_n$ (e.g., similarity measurement, similarity) to the underlying multivariate distribution may now be determined for each of the frequency vectors $x_n$:

$$MD_n = \sqrt{(x_n-\mu)^T S^{-1}(x_n-\mu)} \qquad \text{(formula 1)}$$

where $S^{-1}$ represents the covariance matrix of the matrix X, and $\mu$ represents the component-wise arithmetic mean.

As both the arithmetic mean $\mu$ and the covariance matrix $S^{-1}$ may be heavily influenced by outliers, a robust estimation of the location $\mu$ and scatter S may be used to determine a robust distance.

Figure 5:
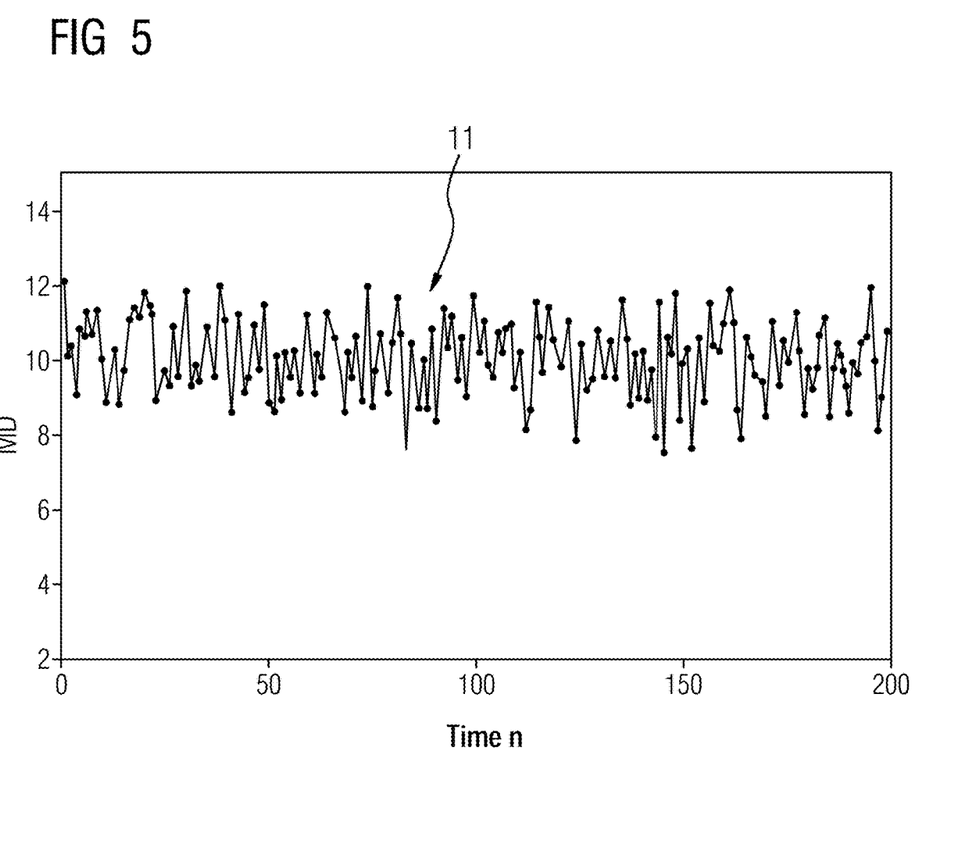
FIG. 5 shows a schematic representation of an exemplary one-dimensional time series of Mahalanobis distances of a matrix of frequency vectors.

As FIG. 5 shows, the matrix X of the frequency vectors $x_n$ is therefore translated into a new one-dimensional time series of distance values $MD_n$ 11 (e.g., similarities of the pattern distributions in the entire sequence, or, more specifically, in an n-th sub-sequence of the entire sequence, to the average pattern distribution in the entire sequence).

Based on the distribution density function of the MD time series 11 (e.g., assumed to be normally distributed and represented by the mean value μMD and the variance σMD (cf., formula 3)), anomaly detection (cf., FIG. 6, "Anomaly detection" 100, 200, 300) is now based for a, for example, n-th day to be examined (e.g., for or represented by a to-be-examined n-th daily time series of event log data 1 (of this "(device) day" to be examined)).

For this purpose, for the n-th daily time series of event log data 1 to be examined, the corresponding frequency vector $x_n$ of the sequential pattern 2 found according to the "PrefixSpan" algorithm is determined. For the corresponding frequency vector $x_n$ to be examined, the associated Mahalanobis distance $MD_n$ (cf., formula 1, similarity measure, similarity) is ascertained 100 (cf., formula 1).

This Mahalanobis distance $MD_n$ is then compared 200 with the one-dimensional time series of distance values $MD_n$ 11 of the "normal operating scenarios" (e.g., the average similarity distribution of the normal operating scenarios) or the distribution/distribution density thereof (e.g., represented by the mean value μMD and the variance σMD) (cf., formula 2 and formula 3), and from this, the anomaly 9 (e.g., an abnormal device state (for the n-th device day to be examined)) or a non-anomaly is determined/identified 300.

For this purpose the parameter γ is introduced:

$$\gamma = \begin{cases} 0, & \text{if } MD_n < \delta \\ 1, & \text{if } MD_n > \delta \end{cases} \quad \text{(formula 2)}$$

with $$\delta = \mu MD + \alpha \sigma MD \quad \text{(formula 3)}$$

Here γ=1=anomaly, and γ=0=no anomaly 300.

The externally specified parameter α determines the sensitivity of the detection method and is not to be set too "acutely" at the start.

Although the invention has been illustrated and described in detail by the exemplary embodiments, the invention is not limited by the examples disclosed, and other variations may be inferred therefrom without departing from the scope of protection sought for the invention.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for determining an abnormal state of a system, wherein system states of the system are described using system state descriptions, the method comprising:
   determining, by a processor, a similarity between a pattern distribution of selected state patterns of the system state descriptions in a first set of system state descriptions and an average pattern distribution of the selected state patterns of the system state descriptions in a second set of system state descriptions, wherein the similarity is a statistical distance;
   comparing, by the processor, the determined similarity with a plurality of similarities between pattern distributions within the second set of system state descriptions and the average pattern distribution in the second set of system state descriptions; and
   determining, by the processor, the abnormal state of the system using the comparison.

2. The method of claim 1, wherein the statistical distance is a Mahalanobis distance.

3. The method of claim 1, wherein the first set of system state descriptions is a system state description time series of a first time period, the second set of system state descriptions is a system state description time series of a second time period, or a combination thereof.

4. The method of claim 3, wherein the second time period is a multiple of the first time period, the first time period is a day, the second time period is a plurality of days, one or more weeks, or one or more months, or any combination thereof.

5. The method of claim 1, wherein the comparing comprises comparing the determined similarity with the plurality of similarities using statistical distribution parameters.

6. The method of claim 5, wherein the statistical distribution parameters include a mean value, a variance, or the mean value and the variance, which are determined for the plurality of similarities.

7. The method of claim 6, wherein the comparing comprises comparing the determined similarity with the plurality of similarities using a predefinable sensitivity parameter.

8. The method of claim 7, wherein the comparing comprises determining a comparison value for the plurality of the similarities.

9. The method of claim 6, wherein determining the comparison value comprises determining the comparison value using the mean value, the variance, the predefinable sensitivity parameter, or any combination thereof.

10. The method of claim 1, further comprising determining and selecting a selected state pattern using a method of sequential pattern detection.

11. The method of claim 10, wherein the method of sequential pattern detection comprises a "PrefixSpan" algorithm.

12. The method of claim 11, wherein the selected state pattern is determined and selected from the system state descriptions in the second set of the system state descriptions.

13. The method of claim 1, further comprising creating a ranking of the selected state patterns having a frequency as the ranking criterion.

14. The method of claim 1, further comprising determining the average pattern distribution using at least one plurality of pattern distributions of the selected state patterns of the system state descriptions in the first set of the system state descriptions using an estimation.

15. The method of claim 1, wherein the system state descriptions in the second set of the system state descriptions are normal system states.

16. The method of claim 1, wherein the system state descriptions of the system are event log data items.

17. The method of claim 1, wherein the system state descriptions are described in the form of alphanumeric values assigned to event log data items.

18. The method of claim 1, wherein the system is a device, a machine, a plant, or a process running in a device, a plant, or a machine.

19. An arrangement for determining an abnormal state of a system, wherein system states of the system are described using system state descriptions, the arrangement comprising:
   a data processor configured to:
      determine a similarity between a pattern distribution of selected state patterns of the system state descriptions in a first set of system state descriptions and an average pattern distribution of the selected state patterns of the system state descriptions in a second set of system state descriptions, wherein the similarity is a statistical distance;
      compare the determined similarity with a plurality of similarities between the pattern distributions within the second set of system state descriptions and the average pattern distribution in the second set of system state descriptions; and
      determine an abnormal state of the system using the comparison.

* * * * *